(12) United States Patent
Yu et al.

(10) Patent No.: US 10,473,299 B2
(45) Date of Patent: Nov. 12, 2019

(54) OPTICAL CONVERTER COLOUR WHEEL

(71) Applicant: Materion Corporation, Mayfield Heights, OH (US)

(72) Inventors: Louisa Yu, Shanghai (CN); Jie Fan, Shanghai (CN); Xianjiang Wang, Shanghai (CN)

(73) Assignee: Materion Corporation, Mayfield Heights, OH (US)

( * ) Notice: Subject to any disclaimer, the term of this patent is extended or adjusted under 35 U.S.C. 154(b) by 0 days.

(21) Appl. No.: 16/173,022

(22) Filed: Oct. 29, 2018

(65) Prior Publication Data

US 2019/0170331 A1  Jun. 6, 2019

Related U.S. Application Data

(63) Continuation of application No. 14/737,816, filed on Jun. 12, 2015, now Pat. No. 10,145,541.

(51) Int. Cl.
| | |
|---|---|
| *G03B 21/20* | (2006.01) |
| *H04N 9/31* | (2006.01) |
| *F21V 17/00* | (2006.01) |
| *F21V 17/16* | (2006.01) |
| *G02B 26/00* | (2006.01) |
| *G02B 7/00* | (2006.01) |
| *G03B 33/08* | (2006.01) |
| *F21V 9/40* | (2018.01) |
| *F21S 41/19* | (2018.01) |

(Continued)

(52) U.S. Cl.
CPC ............ *F21V 17/002* (2013.01); *B60Q 1/02* (2013.01); *F21S 41/125* (2018.01); *F21S 41/16* (2018.01); *F21S 41/176* (2018.01); *F21S 41/192* (2018.01); *F21V 9/40* (2018.02); *F21V 17/162* (2013.01); *G02B 7/006* (2013.01); *G02B 26/008* (2013.01); *G03B 21/204* (2013.01); *G03B 33/08* (2013.01); *G02B 1/11* (2013.01); *H04N 9/3158* (2013.01)

(58) Field of Classification Search
CPC .. G03B 21/204; H04N 9/3158; H04N 9/3161; H04N 9/3111; G02B 26/008; G02B 26/007
See application file for complete search history.

(56) References Cited

U.S. PATENT DOCUMENTS 7,295,392 B2    11/2007  Auell
7,742,249 B2 *   6/2010  Lin ..................... G02B 26/008
                                                            353/84

(Continued)

FOREIGN PATENT DOCUMENTS

EP         2 113 714 A1     4/2009
WO     WO 2014/016574 A1    1/2014

OTHER PUBLICATIONS

International Search Report for International Application No. PCT/US2016/035314 dated Aug. 19, 2016.

*Primary Examiner* — Ryan D Howard
(74) *Attorney, Agent, or Firm* — Fay Sharpe LLP

(57) ABSTRACT

A light converter comprises: a solid-state optical member configured to absorb light of an excitation wavelength and generate light of an emission wavelength; a base; and a mechanical fastener attaching the solid-state optical member to the base. The light converter may be part of a light engine, a phosphor wheel or an automotive headlight. A method of manufacturing such a phosphor wheel is also provided.

19 Claims, 9 Drawing Sheets

(51) Int. Cl.
*F21S 41/16* (2018.01)
*F21S 41/176* (2018.01)
*B60Q 1/02* (2006.01)
*F21S 41/125* (2018.01)
*G02B 1/11* (2015.01)

(56) References Cited

U.S. PATENT DOCUMENTS

| | | |
|---|---|---|
| 2005/0168709 A1 | 8/2005 | Wu |
| 2007/0236816 A1 | 10/2007 | Auell |
| 2008/0049346 A1 | 2/2008 | Cusick |
| 2011/0116253 A1 | 5/2011 | Sugiyama |
| 2011/0149549 A1* | 6/2011 | Miyake ............ F21V 7/22 362/84 |
| 2012/0236264 A1 | 9/2012 | Akiyama |
| 2012/0314411 A1 | 12/2012 | Nagasaki |
| 2014/0254133 A1 | 9/2014 | Kotter et al. |

* cited by examiner

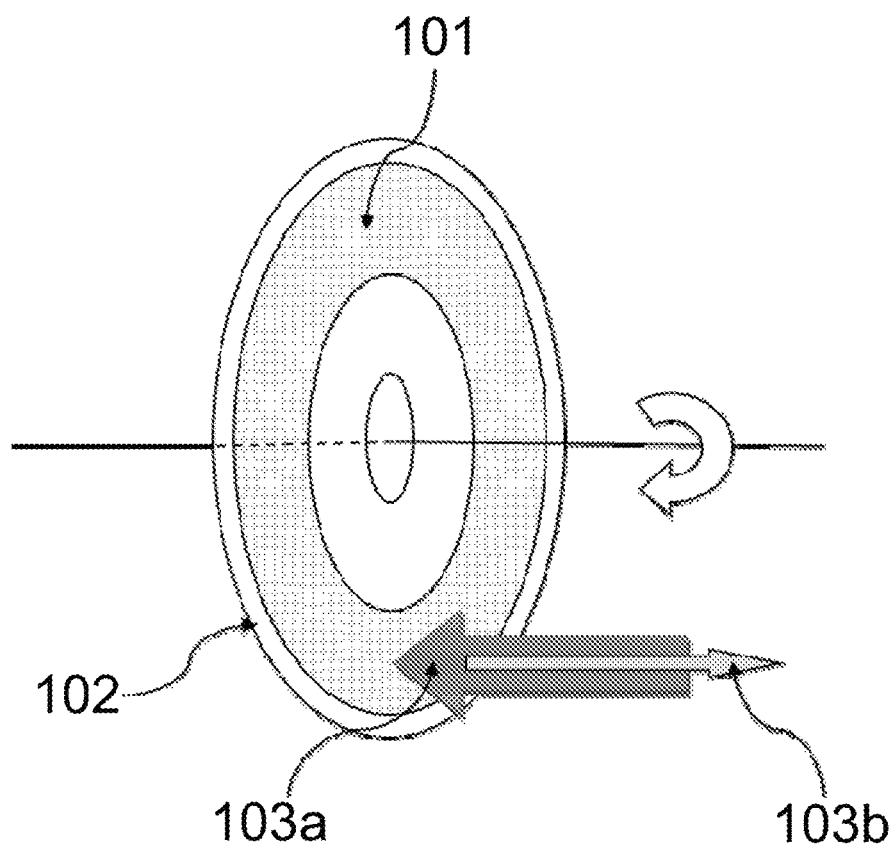
FIG.1 – Prior Art
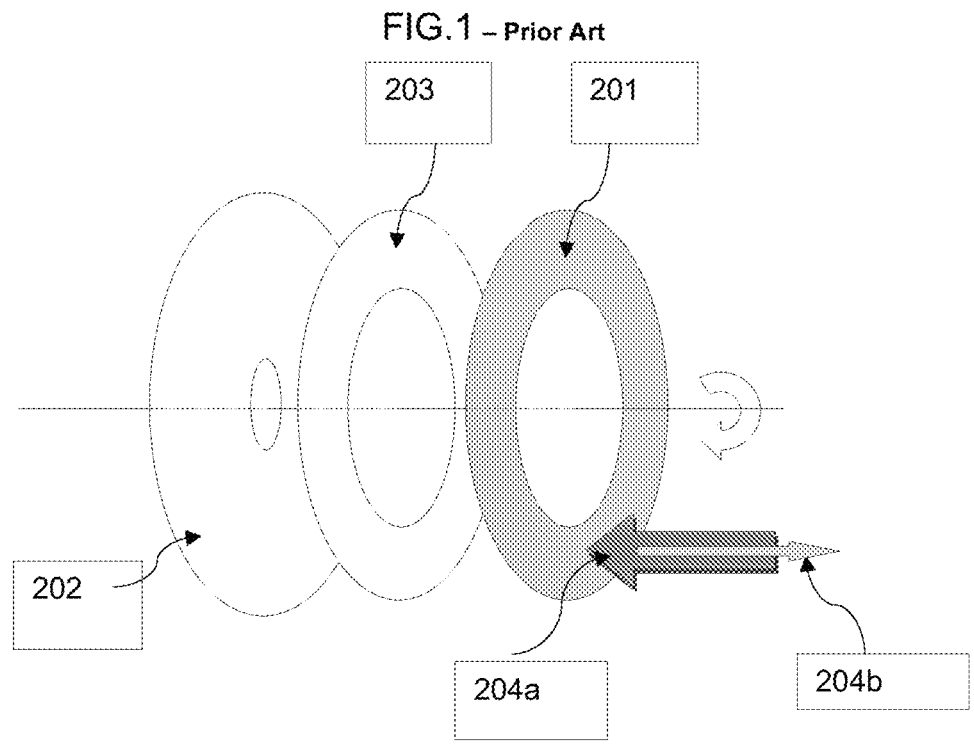
FIG. 2

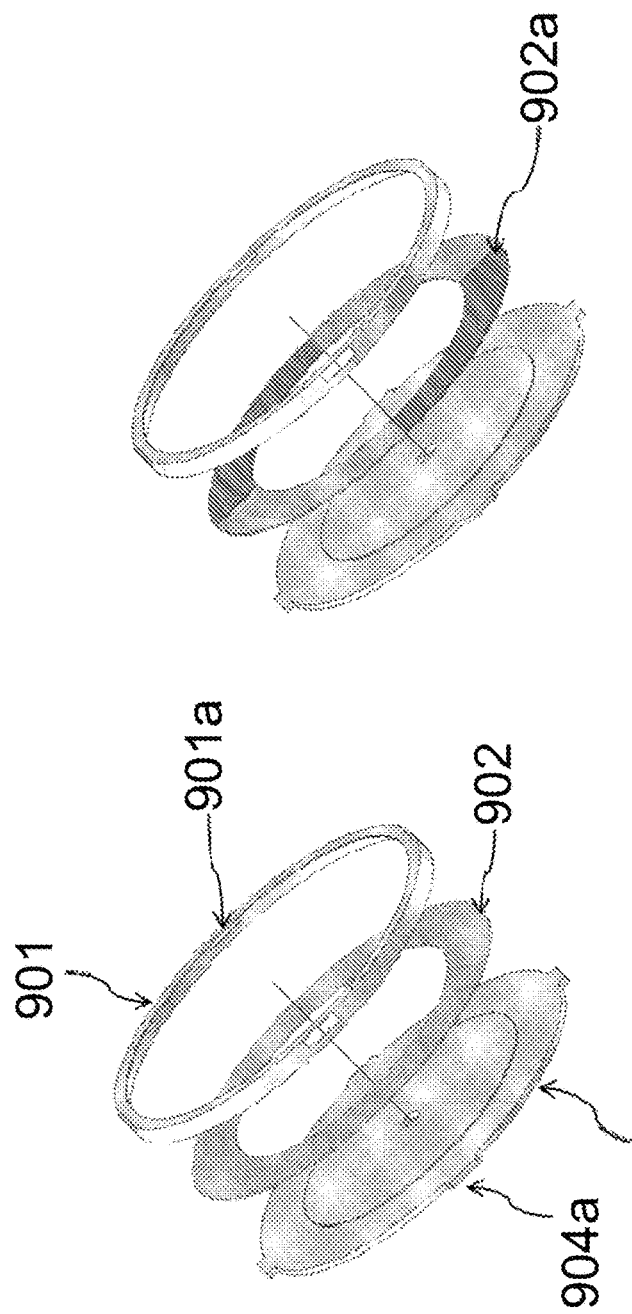
FIG. 11A
FIG. 11B
FIG. 10

OPTICAL CONVERTER COLOUR WHEEL

This is a continuation of U.S. patent application Ser. No. 14/737,816 filed Jun. 12, 2015, which is incorporated by reference in its entirety herein.

TECHNICAL FIELD

The following relates to a light converter, such as a phosphor ceramic colour wheel used for a solid state laser projector to generate colour sequential illumination by wavelength conversion. The following relates as well to laser based illumination source using such phosphor ceramic material.

BACKGROUND

Light conversion (or wavelength conversion) materials such as phosphors are used in a variety of applications, especially in optical devices. One such application is a phosphor-in-silicone colour wheel, which is an optical device for generating emission light of one or typically multiple different wavelengths from excitation light of a single wavelength. An example phosphor-in-silicone colour wheel is described in WO-2014/016574, having common inventorship. In such a phosphor-in-silicone colour wheel, the phosphor powders are dispersed in matrices of liquid transparent silicone and then thermally cured and solidified.

An example, known phosphor wheel structure of this type is shown in FIG. 1. This structure is a phosphor-in-silicone-glue reflective colour wheel. A light converter (in this case, a single colour phosphor-silicone ring) 101 is provided on a metal disc substrate with mirror surface 102. Excitation light 103a (which may also be called source light, input light or exciting light) e.g. from a laser-based illumination source or other light source (not shown) causes the generation of emission light 103b (also called emitting/converted reflected light), when it is incident on the light converter 101. The light converter 101 converts the light spectrum from excitation light of a first range of spectral wavelengths to emission (or re-emission) light of a second, different range of spectral wavelengths. When the excitation laser beam 103a (for example, blue light) focuses on the phosphor ring 101, the conversion light beam 103b (for example yellow light) will emit and will be reflected by the mirror coating metal disk 102, and then will be collected by a lens system. The wheel is comprised of a single colour phosphor ring 101 or multiple colour segments (not shown here), each of which is used to generate light with a particular colour. The phosphor powders are dispersed in liquid transparent silicone by dispensing or screen printing, and then thermally cured and solidified to colour segments on a mirror coating metal disk 102 in a concentric pattern. Then, the colour wheel is mounted on a motor to rotate with high speed. Typically, the disc substrate 102 is rotated during use, although this device can be used in a static (non-rotating) configuration, in which case it may not be known as a phosphor wheel. The light converter 101 is conventionally formed as a coating, comprising phosphor particles in a polymer binder.

However, for higher power applications, undesirable temperature effects have been observed in the conversion material. In an approximately 100 W laser projector, with the excitation laser focused on the phosphor-in-silicone-glue colour wheel, the temperature of the laser conversion area will be over 200 degrees Celsius. At high temperatures, the light conversion efficiency will drop sharply (>10% @ 200 degrees Celsius) due to thermal quenching. Additionally, the silicone glue will degrade seriously with intense laser irradiance and gradually the glue will be burnt. Thus, the phosphor-in-silicone-glue colour wheel cannot achieve a long operational life in high power laser projectors. In life-time tests for such a product, it was established that the safe working temperature should be controlled under 150 degrees Celsius.

It is therefore desirable to create an optical light conversion device that is operable with high-power sources, for example laser projectors, without significant reduction in efficiency or working lifetime.

BRIEF SUMMARY

Against this background, there is provided a light converter comprising: a solid-state optical member configured to absorb light of an excitation wavelength and generate light of an emission wavelength; a base; and a mechanical fastener attaching the solid-state optical member to the base. There is also provided a light converter that comprises a solidstate optical member, a base and a mechanical fastener attaching the solid-state optical member to the base.

The optical member is configured to absorb light of an excitation wavelength and generate light of an emission wavelength. The fastener is a mechanical fastener and so typically holds the base and optical member together by applying a force to one or more surfaces of each component. Parts of the fastener may therefore be in tension or compression when in normal operation. This is in contrast to assemblies that use adhesive to secure the components together.

Advantageously, no adhesive (such as silicone glue) is required to join the optical member (such as a ceramic converter) with a base or reflective metal disk. The use of this glue in known devices may hinder performance at high temperature. Testing results show that the proper working temperature of a device comprising silicone glue may not be higher than 200 degrees Celsius (200° C.). By contrast, devices disclosed herein which do not use silicone glue adhesive may be used in laser projectors that are equipped with lasers operating at more than 100 watts. Moreover, the working temperature of these devices can reach above 200 degrees Celsius (200° C.), while maintaining high luminous brightness.

Additionally, assembly of the light converter is made easy by such a mechanical fastener. Unlike with known devices, glue weighing, mixing, dispensing and curing steps are not required. Mechanical securing is easy and time efficient. Few tools are required for assembly. Additionally, low cost is achievable by mechanical fastening.

The mechanical fastener may rigidly attach the optical member to the base. In other words, the fastener may contact the optical member and the base, such that they do not move relative to one another in normal operation.

A further advantage of a mechanical fastener is that it may be removable. This allows the expensive optical material to be recovered if an error occurs during manufacture. With glue-based prior art assemblies, the components are permanently bonded. If an error occurs during the manufacture of such prior art devices, the whole assembly must be destroyed to recover expensive optical converter material from the optical member.

The mechanical fastener may have a longitudinal part that engages with a corresponding engaging point to allow coupling of the mechanical fastener to the base. In other words, the fastening may include a screw, bolt, nail or rivet.

Usually this longitudinal part has a head that is used to brace against another part of the assembly. The longitudinal part will typically be in tension when in use and therefore clamps the other elements of the assembly together. The longitudinal part may therefore brace part of the optical member against part of the base.

A front plate may be used in conjunction with the longitudinal part, the optical member being between the front plate and the base and the longitudinal part fixing the front plate to the engaging point. This allows the force on the optical member to be spread over a larger area than would be achieved if the head of the longitudinal part were braced directly against the optical member. By spreading the force over a larger area, the likelihood of damage to the optical member is reduced.

The cover hub may be formed by two parts: a hub and a clamping ring. Advantageously, the two parts can be manufactured separately by stamping/punching. A low cost alternative assembly is therefore produced.

The longitudinal part may engage directly with the base. In other words, the base may have an engaging point that accepts the longitudinal part. Alternatively, the longitudinal part may engage with a bracing component, distinct from the base. For example the bracing component may be a nut. The bracing component may also be a threaded adapter that joins the colour wheel with a motor.

The base and/or mechanical fastener may comprise a plurality of deformable clips. Each clip engages with a complementary anchor point on the opposing element. The deformable clips may be sprung members, each exerting a force on their respective anchor point. They may thereby hold the mechanical fastener in place. For example, the clips may be S-shaped springs. The anchor points may be a ridge, a groove or a lip. Alternatively, each of the clips may be a projecting plug and each of the anchor points may be a respective notch or hole.

The mechanical fastener may comprise a cover plate attached to the base. In this case, the optical member may be clamped between the cover plate and the base. For example, the cover plate may be attached to the base by welding (e.g. laser spot welding) or soldering.

The mechanical fastener may comprise an elastic material. For example, the fastener may be aluminium or aluminium alloy. This allows the fastener to be deformed in order to put it in place during assembly. Moreover, the elastic fastener may retain a force while in use.

The optical member may be a round optical member and may have a planar front. The optical member may be supported by the mechanical fastener and/or base on at least part of the rounded outer surface of the optical member. The optical member may be an annular optical member. This member may be supported by the mechanical fastener and/or base along at least part of the rounded inner surface of the annulus. Additionally or alternatively, the optical member may be supported by the mechanical fastener and/or base along at least part of the planar front of the optical member.

The optical member can be made from a ceramic, glass or plastic material and usually contains a phosphor. These materials provide many advantages over traditional phosphor-in-silicone light converters. For example, a ceramic phosphor can maintain light conversion efficiency at temperatures up to at least 300 degrees Celsius (300° C.). Moreover, inorganic materials are usually long-term stable and therefore performance of these devices does not necessarily degrade significantly over time.

Moreover, organic materials, such as those employed in optical members of known devices, exhibit some outgassing at high operating temperatures. This may result in contamination of nearby components in an optical device. In contrast, devices that contain inorganic optical members advantageously exhibit reduced outgassing rates.

Additionally, these inorganic materials may be more durable than traditional silicone materials in high power conditions. They exhibit reliable operation under high laser irradiance and temperature. Moreover, ceramic phosphors (for example) can be flexibly machined into various sizes, shapes and thicknesses. Precise thickness control via polishing of ceramics may be important for performance.

A further advantage of using a solid-state optical member is that the thermal conductivity and heat dissipation of the materials can be higher. This results in relatively lower temperature of phosphors, when compared to that of a known device of equal power comprising a silicone optical converter. For example, the typical thermal conductivity of phosphor ceramics is around 4-1 OW/m K (with the temperature range 300K-500K) whereas those of silicone glue is around 0.1-0 AW/m K. These optical members may therefore have higher conversion efficiency due to less thermal quenching. Moreover, ceramic phosphors can survive under higher laser power densities while yielding a higher luminous output.

The optical member may be configured to absorb blue light and/or generate yellow light and/or green light. For example, the chemical composition of ceramic converters can be pure Ce doped RE-garnets (including Y, Lu etc.), which have absorption near the 440-470 nm of blue range from LDs and have the availability of emission band of yellow and green.

The optical member may have an anti-reflection coating and/or a high-reflection coating on one or more of its surfaces. These coatings may be thin film coatings. Testing results show that, with anti-reflection/high-reflection coating, the light conversion output will improved by around 10%. Moreover, such coatings can work reliably at high temperature. Advantageously, unlike prior art devices, the high-reflective coating on the optical member means that a reflective metal disk is not required. In prior art devices, high reflective metal disks are composed of coated Silver/Sulphur layers on Aluminium substrate. With such reflective metal disk based phosphor wheels, the light converter may fail in time as a result of disk corrosion due to Silver oxidation and Sulphur migration among thin film layers.

The light converter may define an air gap between the base and the optical member. This may cause total internal reflection (TIR) of light that is incident on the surface adjacent to the air gap. As a result, higher reflectivity of conversion light by optical converters can be obtained.

The light converter may be used in a phosphor wheel. The phosphor wheel may be rotatable around an axis normal to a planar surface of the optical member. In this case, the assembly may further include a motor that rotates the base around this axis.

A light engine comprising a light converter or phosphor wheel as previously described is also provided. The light engine may also include a laser-based illumination source.

A projector or an automotive headlight comprising a light engine as previously described is also provided.

There is also provided a method of manufacturing a light converter, comprising attaching a solid-state optical member to a base using a mechanical fastener. The solid-state optical member is configured to absorb light of an excitation wavelength and generate light of an emission wavelength.

The mechanical fastener may comprise a cover plate. Attaching the solid-state optical member to the base may comprise spot-welding the cover plate to the base.

Mass may be added and/or removed to/from the mechanical fastener at a plurality of points (configuring the mechanical fastener, in other words), in order to balance the light converter.

BRIEF DESCRIPTION OF THE DRAWINGS

The invention may be put into practice in a number of ways, and preferred embodiments will now be described by way of example only and with reference to the accompanying drawings, in which:

FIG. 1 shows an example of a known reflective phosphor-in-silicone-glue colour wheel;

FIG. 2 shows an example of a reflective phosphor ceramic-glue color wheel;

FIG. 10 shows two assembly views of a third embodiment in accordance with the disclosure;

FIGS. 11A and 11B schematically illustrate cross-section views of a third embodiment in accordance with the disclosure;

DETAILED DESCRIPTION OF PREFERRED EMBODIMENTS

Figure 3:
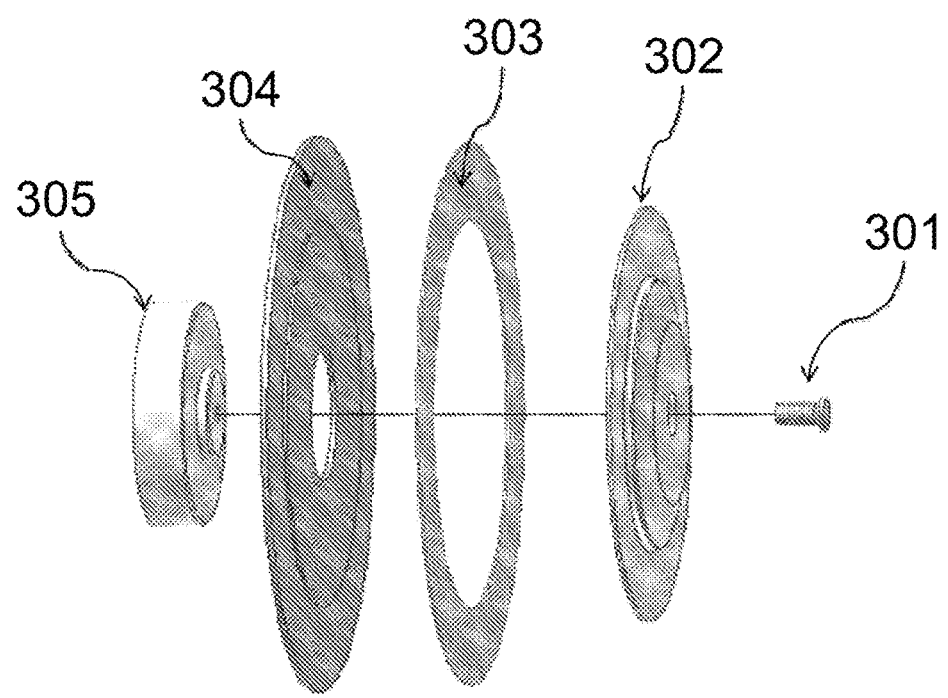
FIG. 3 shows an exploded perspective view of a first embodiment in accordance with the disclosure.

Light converters convert exciting light in one wavelength range to another emission light in another wavelength range. For example, a light converter (which may comprise a phosphor wheel) may convert blue light to green/yellow light. To generate a desired colour sequence, the phosphor wheel may comprise colour segments with different conversion properties. To achieve the desired light output and alleviate localized heating of the conversion material in the laser spot area, fast rotation of the phosphor wheel is recommended.

To increase the conversion light output, in many cases, phosphor wheels are designed to reflect light that is converted. With optical converters that comprise antireflection/high reflection (AR/HR) coating, metal disks with mirror coating are no longer required.

Some performance characteristics such as conversion light output, colour, and lifetime are direct functions of working temperature. At higher operating temperatures, the conversion light output may decrease, the colour may shift, and the lifetime of phosphor wheel may be decreased. Under normal operating conditions, approximately 50%-60% of the input power is output as heat, while the rest of the input power is converted to light. Particularly, when the input laser power reaches as high as several hundred watts, the heat generation during the conversion will cause high temperature more than 200 degrees Celsius (200° C.). Thermal effect considerations must be therefore be taken into the product structure design. This is at least so that the solid optical converter can dissipate the heat by effective heat conduction. In order to increase the heat dissipation from the working optical converter, while also reducing weight loading of motor and decreasing the cost, a substrate to support or clamp optical converters may use metals with high thermal conductivity. Aluminium/aluminium alloy may be used as the substrate and manufactured in a cost efficient way of stamping or punching.

An improved solution including a phosphor colour wheel can use ceramic phosphors as a converter. In some such devices, transparent silicone glue is applied to join the ceramic converter with a reflective metal disk. FIG. 2 is a schematic view of ceramic phosphor colour wheel of 200 of such a device. The colour segments are changed from the composition of phosphor-in-silicone-glue to the composition of ceramic phosphors. The phosphor ceramic colour ring 201 or colour segments are attached to metal disk with mirror surface 202 by optically transparent silicone glue 203. The figure shows "exciting light" (input light) 204a e.g. from a laser-based illumination source or other light source (not shown) and emitting/converted reflected light 204b. However, because of the previously mentioned characteristics of the glue, the product cannot work under high temperature. Testing results show that the proper working temperature cannot be higher than 200 degrees Celsius (200° C.).

Some devices disclosed herein provide a total solid product solution, avoiding any glue, adhesive or paste. As a result, the product therefore achieves an improved performance and improved durability, even in high power laser projection display systems. Devices disclosed herein may be used in applications where the solid state laser projector can be equipped with laser power in excess of than 100 watts. The working temperature of such devices can reach above 200 degrees Celsius (200° C.) to enable high luminous brightness.

Referring to FIG. 3, there is shown an exploded perspective (assembly) view of such an optical converter colour wheel according to a first embodiment. A structure including a longitudinal member is provided to mechanically fasten the reflective ceramic phosphor colour wheel to the base. The solid optical converter (for example, a phosphorceramic based optical converter ring) 303 is secured between the base (or supporting substrate) 304 and the front plate (or cover hub) 302 by a central longitudinal member (for example a screw) 301. A threaded adapter 305 may then join the colour wheel with a motor. To precisely fix the optical converter, a step or a groove is formed on the supporting substrate. The cover hub only presses the optical converter along the inner rim. By such a configuration, a highly radical concentric structure is obtained. Any unbalance can be easily corrected by removing mass from the thicker circular column in the central portion of the cover hub (the hat body of the cover hub) in a subsequent dynamic balancing process. In this way, the material removing balancing process can be easily operated. In this example, the base and front plate 302 and 304 may be formed of the material of 6061 Aluminium alloy. The colour wheel has an outer diameter of 50 mm. Other sizes are possible and may be used.

Figure 4:
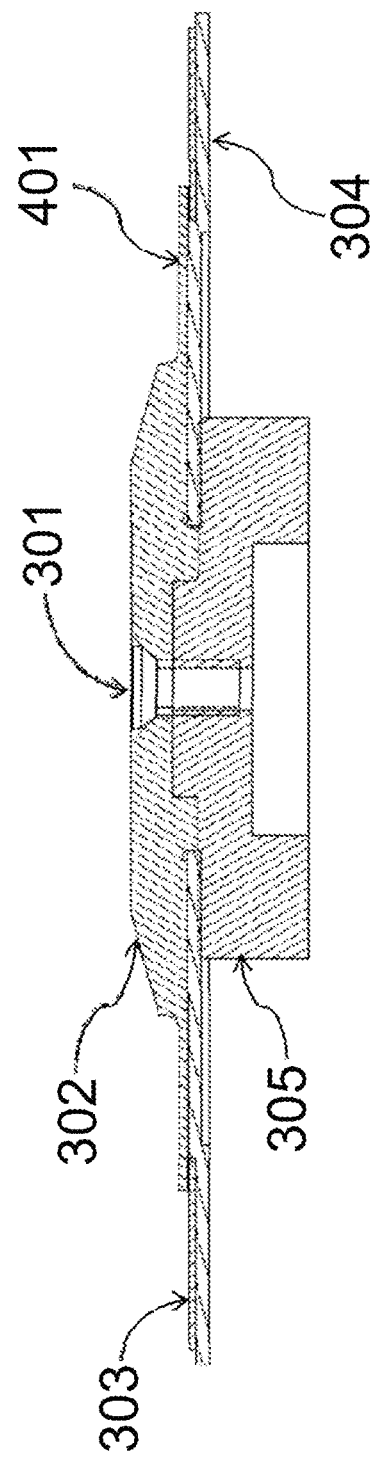
FIG. 4 schematically illustrates a cross-section view of a first embodiment in accordance with the disclosure.

FIG. 4 shows a sectional view of optical converter colour wheel according to the first embodiment of FIG. 3. In this arrangement, the outer rim ring area 401 of the cover hub 302 may be as thin as 0.2 mm. This advantageously allows the device to be used in light engine systems where the collecting lens system is close to the top surface of phosphor luminous ring. Additionally, jitter of the rotating colour wheel can be reduced in a dynamic balancing process. This is performed in order to avoid contact of the colour wheel with the lens system as a result of jitter.

Figure 5:
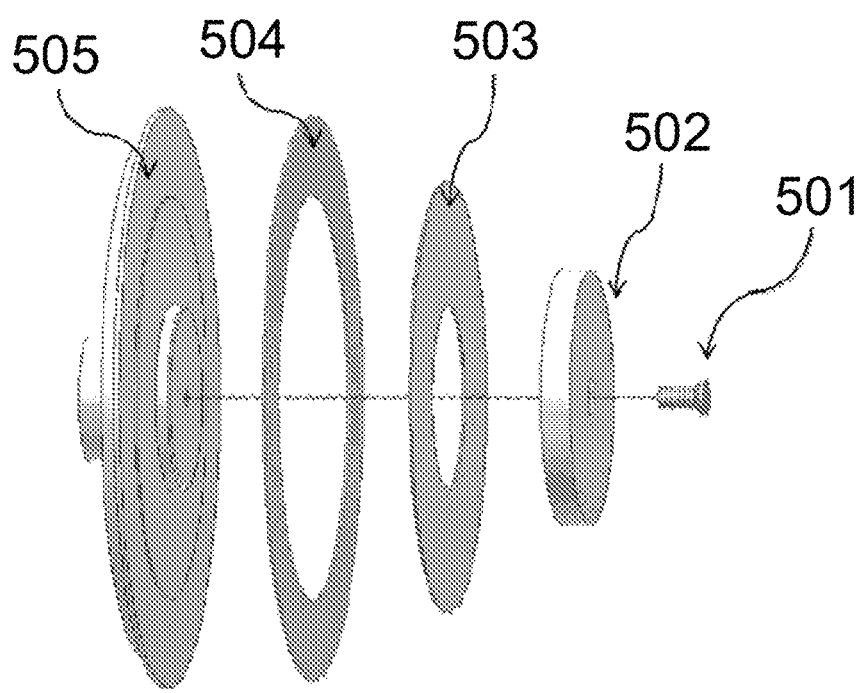
FIG. 5 shows an assembly view of an alternative first embodiment in accordance with the disclosure.
Figure 6:
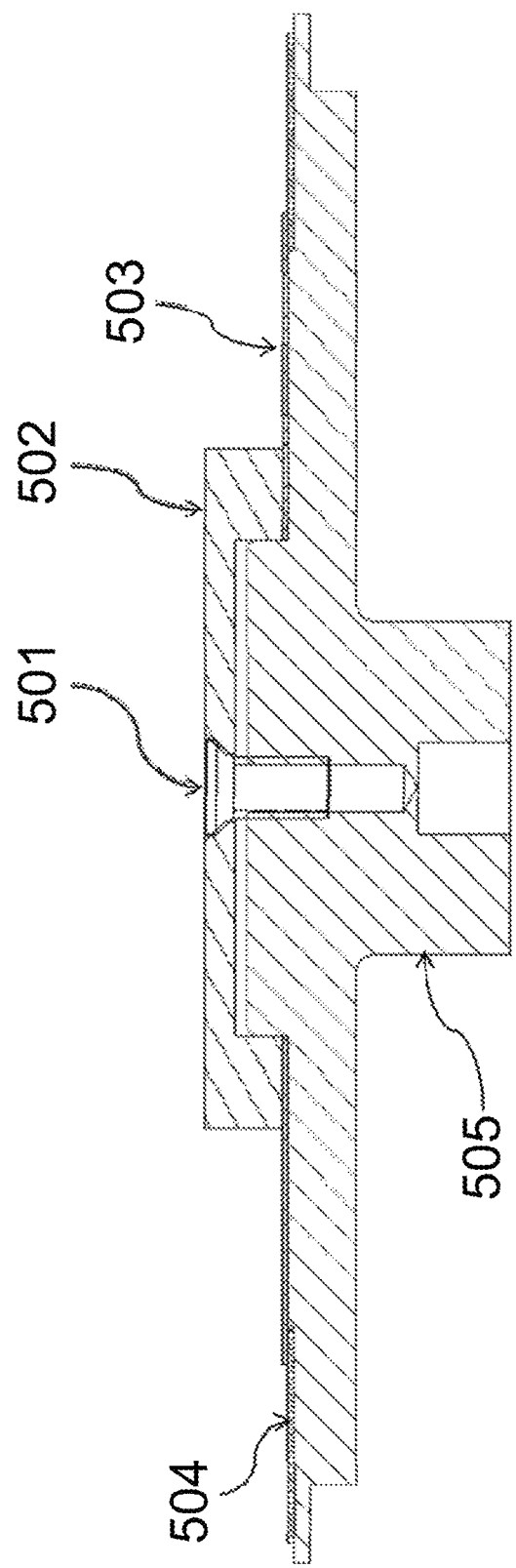
FIG. 6 schematically illustrates a cross-section view of the alternative first embodiment in accordance with the disclosure.

FIG. 5 shows an assembly view of optical converter colour wheel according to an alternative first embodiment. FIG. 6 shows a sectional view of the same structure. The cover hub in this example is formed by two parts: the hub 502 and the clamping ring 503, as shown in FIG. 5 and FIG. 6. The solid optical converter 504 is secured between a threaded base substrate 505 and a clamp plate 503 by a central longitudinal member 501. In this way, the two parts of the cover hub (the hub and the clamping ring) can be manufactured separately by stamping/punching. As a result, a low cost alternative assembly is produced.

Figure 7:
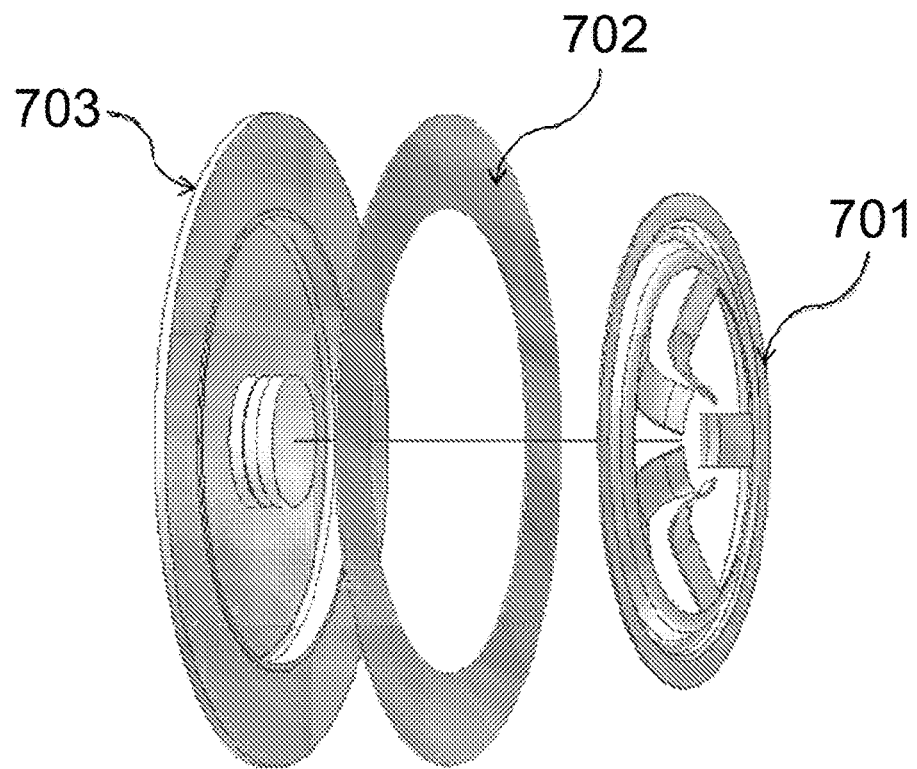
FIG. 7 shows an assembly view of a second embodiment in accordance with the disclosure.
Figure 8:
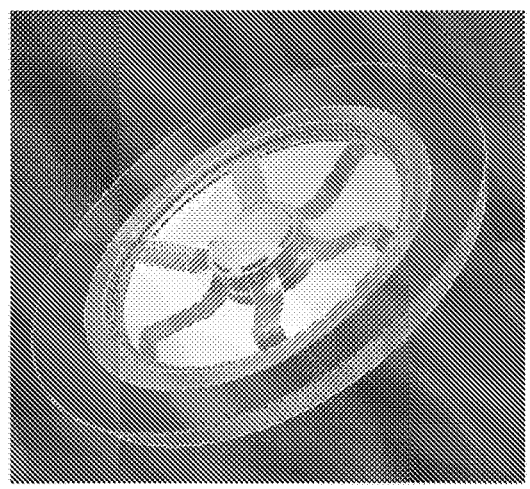
FIG. 8 shows a perspective view of a second embodiment in accordance with the disclosure.
Figure 9:
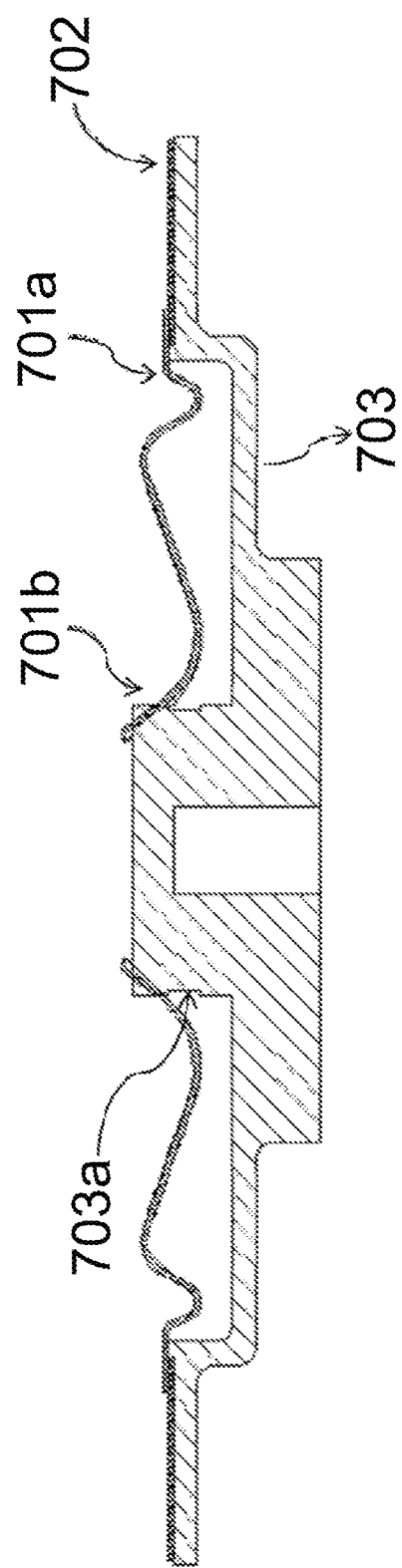
FIG. 9 schematically illustrates a cross-section view of a second embodiment in accordance with the disclosure.

FIG. 7 shows an assembly view of an optical converter colour according to a second embodiment. FIG. 8 shows a perspective view and FIG. 9 shows a sectional view of the same structure. In this type structure, the phosphor-ceramic based optical converter ring 702 is seated on the outer ring shaped area of the base (or supporting substrate) 703. The optical member is clamped against the base 703 by an S-shaped spring 701. The spring is mounted in the slot of the base 703, with its one circular end 701 a pressing the inner rim of the optical converter 702 and with its other claw shaped ends 701 b holding against in the groove of the central shaft 703a of the supporting substrate 703. The depth and width of the slot, as well the groove height of the central shaft in the optical converter holder substrate 703 may preferably be designed and optimized so that the clamping force is appropriate.

Although an S-shaped spring is shown, other spring configurations are possible. There are 5 spring claws in the example embodiment shown in FIG. 5. Alternatively, the number of claws may be different. The number of claws may be 6 or 8, for example. The material for this spring may be stainless steel, spring steel, brass, or copper. Other alternatives are also possible.

The spring can be manufactured as thin as 0.15 mm in a cost effective method of stamping. By such a configuration, a highly concentric structure is provided. In such a structure, it is advantageously relatively easy to correct the unbalance by adding mass to the spring at some points. A cheap, simple and configurable assembly is therefore provided.

FIG. 10 shows an assembly view of an optical converter colour wheel according to a third embodiment. FIGS. 11A and 11B show sectional views of the same structure. In this embodiment, the base (supporting substrate) 904, has projecting plugs 904a distributed along the outer flank. The fitting cover ring 901 is made of spring material and has respective notches 901 a in positions corresponding to the projecting plugs. The optical converter is held in place between the base and the cover ring by joining the cover ring to the base by the snap-on of plugs and notches. The optical converter 902 may be seated in a recess ring area of the cover ring 901.

One difference in this configuration is that the force is applied to the outer rim of the optical converter. In contrast, in other configurations (such as those described earlier), the clamping force is applied to the inner rim of the optical converter. By a configuration according to this third embodiment, individual colour segments 902a can be combined as required in order to generate a desired emission spectrum. They may then be fastened using a cover ring that engages with the outer edges of the segments, without the need for glue. Parts of the cover ring and base may be fabricated by stamping. Advantageously, this method is very cost effective.

FIGS. 10, 11A and 11B show projecting plugs on the base and respective notches on the cover ring, however, it will be apparent to the skilled person that alternatives are possible. For example, some or all of the plugs may be on the cover ring with corresponding notches in the base.

Figure 12:
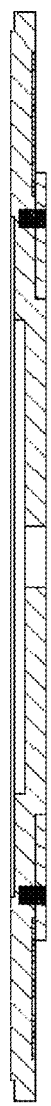
FIG. 12 shows two perspective views of a fourth embodiment in accordance with the disclosure.
Figure 13A:
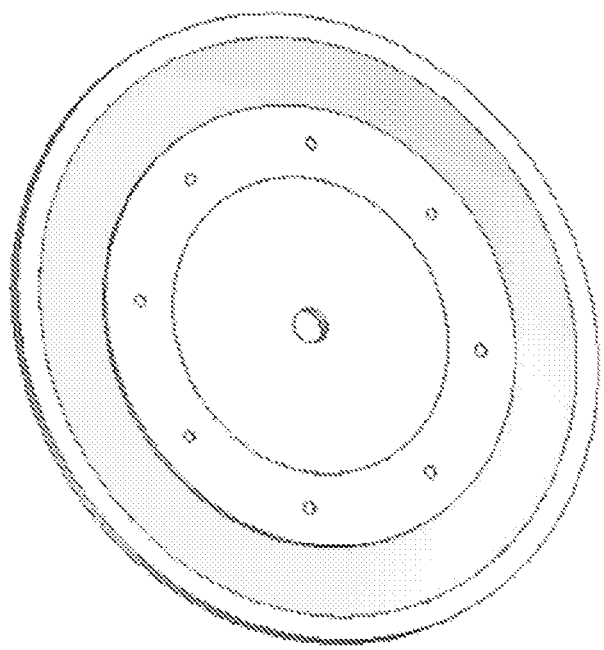
FIGS. 13A and 13B schematically illustrate cross-section views of a fourth embodiment in accordance with the disclosure.
Figure 13B:
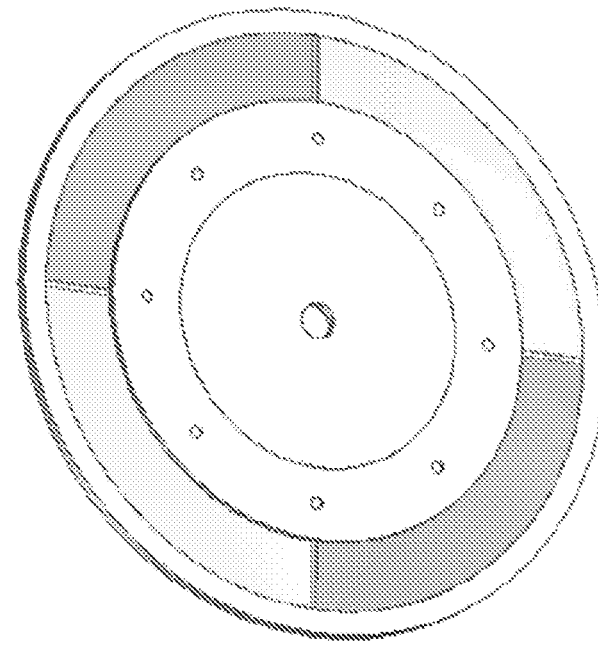

FIG. 12 shows a perspective view of optical converter colour wheel, according to a fourth embodiment. In this embodiment, a cover plate is used to attach the optical converter colour wheel to the base, as an alternative to glue/adhesive. The optical converter is sandwiched between the base substrate and the cover plate. The base substrate and the cover plate can be made of metals, such as, aluminium alloy, stainless steel etc. The base substrate and the cover plate are mechanically attached by means of attaching the metals directly together. For example, the base substrate and the cover plate may be attached by welding (for example laser spot welding) or soldering. For the laser spot welding, only the laser spot area is affected by the heat. The expensive optical converter may therefore not be damaged by this method of fastening.

Although specific embodiments have been described, the skilled person will understand that variations and modifications are possible. For example, the designs may be applicable to all solid-state light converters and not necessarily only those using a ceramic material, for example a glass-based or plastics-based material may be used. The glass-based or plastics-based material may act as a substrate that is coated with a phosphor.

For a reflective phosphor wheel, a layer of thin film coating of anti-reflection (AR) in the wavelength band of emission light, and/or another layer of thin film coating of high reflection (HR) in the wavelength band of emission light after conversion, may be applied to one or both sides of thin ceramic converters. This may be done in order to further improve the light conversion efficiency of ceramic converters. Testing results show that, with the AR/HR coating enhancement, the light conversion output will improved by around 10%. Moreover, AR/HR coating can work reliably under high temperature.

Particularly, with HR coating on the ceramic converters, a high reflective metal disk may not be required. In known reflective phosphor wheel systems, a high reflective metal disk is provided. Such disks are typically composed of coated Silver/Sulphur layers on an aluminium substrate. With such a metal disk based phosphor wheel, after some period of operation, a failure mode of disk corrosion due to Silver oxidation and Sulphur migration among thin film layers may be observed.

The solid optical converter colour wheel may include a colour wheel motor, an optical converter, a converter supporting substrate and a converter clamping component. The optical converter is secured directly by the supporting substrate and the clamping component. By such configurations eliminating or omitting glue/adhesive/paste, light converters can work properly under high temperature. For example, light converters disclosed herein can be used in high power laser projectors. These reflective phosphor wheels are used to convert exciting light in one wavelength range to another emission in the other wave length range. For example, the colour wheel may convert blue light to yellow or green light, particularly in laser projection display systems. These optical converters may also be used in automotive headlights.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A light converter comprising:
   an annular solid-state optical member comprising a phosphor, the annular solid state optical member configured to absorb light of an excitation wavelength and generate light of an emission wavelength;
   a disk-shaped base; and
   a cover ring secured with the disk-shaped base and retaining the annular solid-state optical member by engaging an outer rim of the annular solid-state optical member;
   wherein no clamping force is applied to an inner rim of the optical converter.

2. The light converter of claim 1 wherein the annular solid state optical member comprises a plurality of color segments wherein the cover ring retains the color segments by engaging the outer rims of the color segment.

3. The light converter of claim 2 wherein the cover ring does not engage the inner rims of the color segments.

4. The light converter of claim 1 wherein the cover ring does not engage the inner rim of the annular solid-state optical member.

5. The light converter of claim 1 wherein the outer rim of the annular solid-state optical member is disposed between the disk-shaped base and the cover ring.

6. The light converter of claim 1, wherein the annular solid-state optical member is configured to absorb blue light and generate at least one of yellow light and green light.

7. The light converter of claim 1, wherein the annular solid-state optical member comprises an annular ceramic phosphor member.

8. The light converter of claim 1, wherein the disk-shaped base includes a central opening.

9. A phosphor wheel comprising:
   the light converter of claim 1; and
   a motor arranged to rotate the disk-shaped base around an axis passing through the disk-shaped base and normal to a planar surface of the annular solid-state optical member.

10. The light converter of claim 1 wherein no adhesive secures the annular solid-state optical member to the disk-shaped base.

11. A light converter comprising:
    an annular solid-state optical member comprising a phosphor, the annular solid state optical member configured to absorb light of an excitation wavelength and generate light of an emission wavelength;
    a disk-shaped base; and
    a cover ring secured with the disk-shaped base and retaining the annular solid-state optical member by engaging an outer rim of the annular solid-state optical member;
    wherein the cover ring is secured with the disk-shaped base by plugs projecting from one of an outer flank of the disk-shaped base and the cover ring mated with corresponding notches of the other of the outer flank of the disk-shaped base and the cover ring.

12. A phosphor wheel comprising:
    an annular ceramic phosphor member;
    a disk-shaped base; and
    a cover ring secured with the disk-shaped base and retaining the annular ceramic phosphor member by engaging an outer rim of the annular ceramic phosphor member;
    wherein the cover ring is secured with the disk-shaped base by plugs projecting from one of an outer flank of the disk-shaped base and the cover ring mated with corresponding notches of the other of the outer flank of the disk-shaped base and the cover ring.

13. The phosphor wheel of claim 12 wherein the outer rim of the annular ceramic phosphor member is disposed between the disk-shaped base and the cover ring.

14. The phosphor wheel of claim 12, wherein the annular ceramic phosphor member is configured to absorb blue light and generate at least one of yellow light and green light.

15. The phosphor wheel of claim 12 wherein the disk-shaped base is configured for connection with a motor for rotating the disk-shaped base around an axis passing through the disk-shaped base and normal to a planar surface of the annular ceramic phosphor member by a threaded adapter or a central opening of the disk-shaped base.

16. The phosphor wheel of claim 12 further comprising:
    a motor connected with the disk-shaped base for rotating the disk-shaped base around an axis passing through the disk-shaped base and normal to a planar surface of the annular ceramic phosphor member.

17. The phosphor wheel of claim 12 wherein the annular ceramic phosphor member comprises a plurality of color segments wherein the cover ring retains the color segments by engaging the outer rims of the color segments.

18. The phosphor wheel of claim 17 wherein the cover ring does not engage the inner rims of the color segments.

19. A projector for generating color sequential illumination, the projector comprising:
    the phosphor wheel of claim 17; and
    a light source arranged to apply exciting light to the annular ceramic phosphor member.

* * * * *